H. WYMAN.
MECHANISM FOR SHIFTING DROP-SHUTTLE BOXES IN LOOMS.

No. 193,309. Patented July 17, 1877.

Witnesses.
Edwin M. Frazer
Charles F. Randall

Inventor.
Horace Wyman.
per Crosby & Gregory Attys

UNITED STATES PATENT OFFICE.

HORACE WYMAN, OF WORCESTER, MASSACHUSETTS.

IMPROVEMENT IN MECHANISMS FOR SHIFTING DROP SHUTTLE-BOXES IN LOOMS.

Specification forming part of Letters Patent No. 193,309, dated July 17, 1877; application filed November 2, 1876.

*To all whom it may concern:*

Be it known that I, HORACE WYMAN, of the city and county of Worcester, in the State of Massachusetts, have invented Improvements in Apparatus for Operating Changeable Shuttle-Boxes, of which the following is a specification:

This invention relates to mechanism for operating shuttle-boxes in fancy-looms, and has particular reference to the combination, with the main and auxiliary levers, of toothed wheels connected directly with the levers through crank-pins, the toothed wheels being operated by slide-bars under the control of a pattern-surface and lifters, substantially as hereinafter described.

Figure 1:
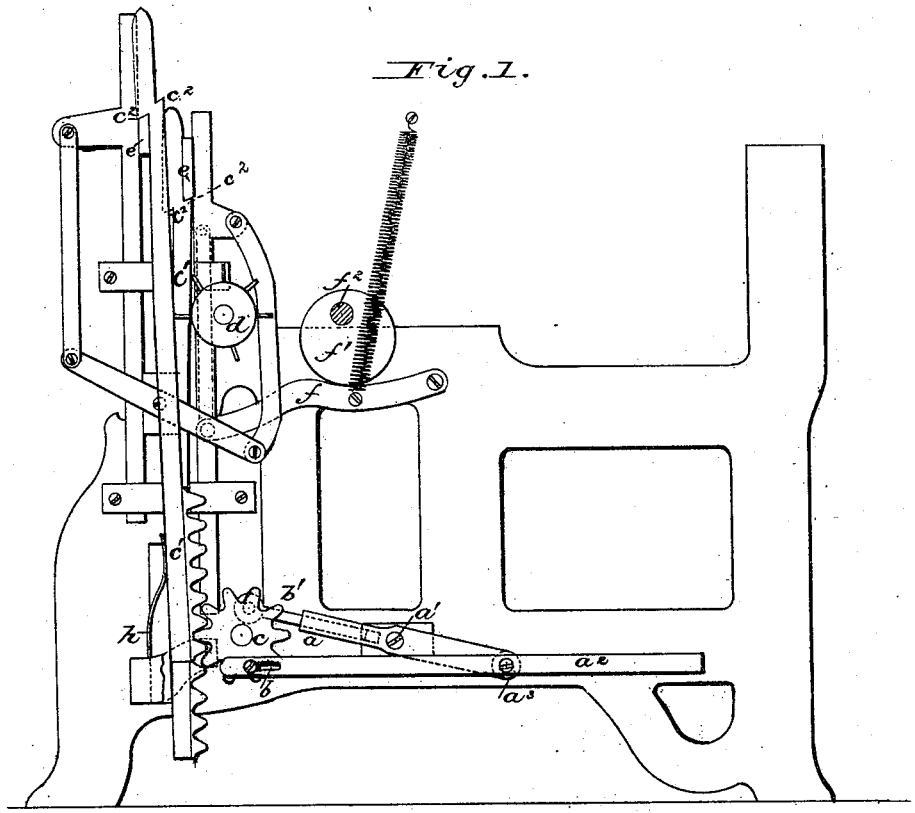
Figure 2:
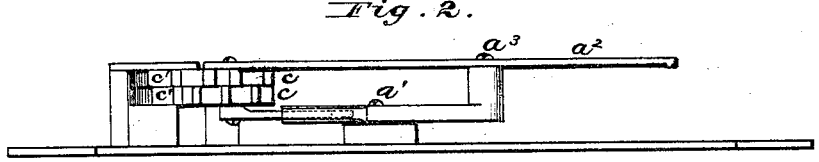
Figure 3:
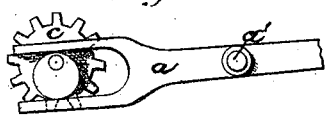

Figure 1 represents, in side elevation, sufficient of a loom to illustrate my invention; Fig. 2, a partial top view thereof, and Fig. 3 a modification.

The auxiliary lever $a$, pivoted at $a^1$, carries at its outer end, on a pivot, $a^3$, a shuttle-box lever, $a^2$, connected at one of its ends, in any usual way, with a shuttle-box rod. The shuttle-box and auxiliary levers are combined in a manner similar to that represented in my reissued Patent No. 6,567, dated July 27, 1875; but, instead of operating the levers by connecting-rods and cranks, as therein shown, I, in this instance, connect the crank-pins directly with the levers by either a pin extending through a slot in the lever, as at $b$, Fig. 1, wherein lever $a^2$ has a slot at its back end, or by means of a telescopic connection, as at $b'$, wherein one part slides within another, such connection being shown as a rod pivoted to the crank-pin, and adapted to enter a hole made in the lever $a$. Instead of placing the crank-pins as shown in Fig. 1, I may place them eccentrically at the center of the toothed wheels $c\ c$, as at Fig. 3. The crank-pins are carried by toothed wheels $c\ c$, actuated by racks attached to sliding bars $c^1\ c^1$, provided with hooks $c^2\ c^2$, as herein shown, one at each side, and adapted to be placed by the pattern-surface $d$, so as to be engaged by the lifter and depressor $e\ e$, operated by a lever, $f$, to which motion is communicated by a cam, $f^1$, on the crank-shaft $f^2$. The springs $h\ h$ act to throw the bars $c^1\ c^1$ against the pattern-surface, and they also act as friction devices to prevent the bars from being moved faster than the lifters by which they are actuated.

The devices herein shown are specially adapted to operate four shuttle-boxes, the change of position of the two levers which may be in unison or in opposition enabling any one of the four shuttle-boxes to be brought into position at any one movement, such positions being governed by the presence or absence of projections on the pattern-surfaces, two projections placing the hooks $c^2\ c^2$ in the path of the lifter $e$, the movement of which carries both crank-pins in one direction, thereby moving both levers in the same direction, which will move the bottom shuttle-box into position. The absence of projections will allow the sliding bars to fall back and place both hooks $c^2\ c^2$ in the path of the depressor $e$, the movement of which will carry the cranks in the opposite direction, and thereby place the top box in position; and one projection, operating on one of the sliding bars, will operate to carry one crank in one direction, and the other in the opposite direction, thereby bringing the second box, while one projection, operating on the other bar only, will place the cranks in position for bringing the third box.

I claim—

1. A lever connected at one end with shuttle-boxes and its actuating crank-pin, an auxiliary lever pivoted upon a fixed fulcrum and connected with the shuttle-box lever, and an actuating crank-pin for it, in combination with two toothed wheels and two reciprocating toothed surfaces, the toothed wheels turning the crank-pins, the crank-pins in contact with and moving the levers, and the toothed surfaces moving the toothed wheels, the whole under the control of a pattern, the combination being substantially as set forth.

2. A lever connected at one end with shuttle-boxes and a crank-pin in contact with said lever to move the same, in combination with an auxiliary lever pivoted upon a fixed fulcrum and supporting the shuttle-box lever, and with a crank-pin in contact therewith, and mechanism, as described, for giving an oscillating movement to said crank-pins to move the auxiliary lever, whereby four shuttle-boxes may be operated, substantially as set forth.

3. The combination of the main and auxiliary levers, with their respective crank-pins and mechanism, as described, for oscillating the same, with the pattern-indicating surface, whereby any one of the shuttle-boxes is placed in position by the crank-pins in contact with the levers $a\ a^2$, under the government of the indicating mechanism, substantially as described.

In testimony whereof I have signed my name to this specification in the presence of two subscribing witnesses.

HORACE WYMAN.

Witnesses:
   J. A. WARE,
   LIZZIE H. WARE.